(12) United States Patent
Allison et al.

(10) Patent No.: US 7,853,784 B2
(45) Date of Patent: Dec. 14, 2010

(54) FILTERING AND APPLICATION TRIGGERING PLATFORM

(75) Inventors: Rick L. Allison, Cary, NC (US); Thomas M. McCann, Morrisville, NC (US); Apirux Bantukul, Cary, NC (US); Richard Edward Schaedler, New Hill, NC (US)

(73) Assignee: Tekelec, Morrisville, NC (US)

( * ) Notice: Subject to any disclaimer, the term of this patent is extended or adjusted under 35 U.S.C. 154(b) by 752 days.

(21) Appl. No.: 10/427,491

(22) Filed: May 1, 2003

(65) Prior Publication Data
US 2004/0059910 A1    Mar. 25, 2004

Related U.S. Application Data

(60) Provisional application No. 60/377,866, filed on May 2, 2002.

(51) Int. Cl.
*H04I 9/00* (2006.01)
(52) U.S. Cl. .................. 713/154; 713/153; 370/467; 379/207.02
(58) Field of Classification Search .............. 713/1, 713/2, 188, 194, 153, 154; 380/200, 201, 380/255, 277; 726/2; 370/467; 379/207.02
See application file for complete search history.

(56) References Cited

U.S. PATENT DOCUMENTS

| 1,895 | A | * | 12/1840 | Hoffpauir et al. | ....... | 408/115 R |
| 4,558,298 | A | * | 12/1985 | Kawai et al. | .................. | 187/380 |
| 5,579,371 | A | * | 11/1996 | Aridas et al. | ............. | 379/32.03 |
| 6,324,183 | B1 |  | 11/2001 | Miller et al. | | |

(Continued)

FOREIGN PATENT DOCUMENTS

| EP | 1 139 674 A2 | 10/2001 |
| WO | WO 98/46030 | 10/1998 |

OTHER PUBLICATIONS

Communication pursuant to Article 94(3) EPC corresponding to European Application No. 03724345.8 (Sep. 29, 2008).

(Continued)

*Primary Examiner*—Kimyen Vu
*Assistant Examiner*—Joseph Pan
(74) *Attorney, Agent, or Firm*—Jenkins, Wilson, Taylor & Hunt, P.A.

(57) ABSTRACT

A filtering and application triggering platform may be implemented on a signaling message routing node to decode signaling messages and increase efficiency in subsequent processing of the signaling message. A communications link module on a signaling message routing node receives a signaling message. A first filtering and application triggering module associated with the communication link module extracts predetermined parameters from the signaling message and generates a decode key based on the parameters. The first filtering and application triggering module applies a first triggering rule to the decode key and determines whether to forward or drop the message. If the first filtering and application triggering module determines that the message should be forwarded, the first filtering and application triggering module forwards the message to another processing module within the signaling message routing node. The decode key is forwarded along with the message. The next processing module may extract additional parameters from the message, add the parameters to the decode key, and apply a triggering rule to the modified decode key.

40 Claims, 9 Drawing Sheets

U.S. PATENT DOCUMENTS

| | | |
|---|---|---|
| 6,327,350 B1 | 12/2001 | Spangler et al. |
| 6,529,524 B1 | 3/2003 | Liao et al. |
| 6,959,076 B2 * | 10/2005 | Chang et al. ........... 379/207.02 |
| 7,047,525 B2 * | 5/2006 | Prunty et al. ................ 717/137 |
| 7,050,549 B2 * | 5/2006 | Hannigan ................ 379/32.02 |
| 2002/0052200 A1 | 5/2002 | Arkko et al. |
| 2003/0081755 A1 * | 5/2003 | Macartney et al. .......... 379/243 |
| 2005/0088977 A1 * | 4/2005 | Roch et al. .................. 370/254 |

OTHER PUBLICATIONS

Communication of the Supplementary European Search Report for European Application No. 03724345.8 (Jun. 6, 2008).

Notification of Transmittal of the International Search Report or the Declaration for International Application No. PCT/US03/13470 (Sep. 24, 2003).

Tekelec, "Eagle® Feature Guide," PN/9110-1225-01, (Jan. 1998).

* cited by examiner

FILTERING AND APPLICATION TRIGGERING PLATFORM

RELATED APPLICATIONS

This application claims the benefit of U.S. Provisional Patent Application Ser. No. 60/377,866, filed May 2, 2002, the disclosure of which is incorporated herein by reference in its entirety.

BACKGROUND ART

Networks, especially wireless networks, are becoming increasingly feature-rich and, consequently, increasingly complex. With the advent of number portability, wireless roaming, wireless internet access, wireless data applications, and other services, adding more intelligence to the network and deploying these services more efficiently is a top priority. Additionally, concerns over network security have led to increased demands for more robustness in the signaling network.

In providing the various services required in today's networks, much of the processing required to screen and distribute a message to the proper service-providing application or processor is unnecessarily duplicated. For example, in an SS7 signal transfer point, a received signaling message typically goes through gateway screening, message discrimination, and message distribution before being delivered to the appropriate application. Each of these steps associated with screening and distributing the received message may include parsing the message, reading certain parameters, and determining how to proceed based on the parameters. Because of overlap in message parameters extracted and processed by the screening, discrimination, and distribution functions, and the application, valuable processor cycles can be wasted. Thus, there exists a need for improved methods and systems for processing received messages in a manner that avoids duplicative message processing.

Another problem with conventional message processing is that desired parameters needed to process received signaling messages are not located in the same message field for all types of signaling messages. Because parameters of interest may be located in different fields or locations in different message types, complex processing logic is required to decode each message. This complex processing logic increases the time required for processing each message, especially when the same parameter is used multiple times.

Accordingly, there exists a long-felt need for improved methods and systems for directing signaling messages to the appropriate application while avoiding duplicative processing.

DISCLOSURE OF THE INVENTION

The present invention includes a filtering and application triggering (FAT) platform. The filtering and application triggering platform is a new entity that can be provided on a signaling message routing node, such as a signal transfer point, with the capability to intercept and decode the fields and parameters within an SS7 message and, based on examination of combinations of those fields and parameters, either send the message and the decoded information to a specific separate application engine (AE) or take an immediate action on the message, such as discarding the message. If the message is sent to an AE, the AE will then be responsible for using the message and decoded information to provide the correct message treatment. Sending the decoded information with the message avoids the need for subsequent processing functions to parse the message to extract the information included in the decoded information. As a result, duplicative processing is reduced. In addition, because the decode key preferably has a common format for all message types, the need for complex processing logic to locate a field of interest is reduced.

The FAT platform may perform simple actions such as allowing or discarding a message signaling unit (MSU) based on MTP and SCCP-layer information, as well as ISUP and TCAP-layer information. More complex actions (such as throttling), or actions based on parameters deep within the TCAP layer (such as per-subscriber number screening) may require the FAT platform to be paired with an AE.

Some AEs that may be paired with the FAT platform include the following:
SMS SPAM Control
SMS Flood Control
ISUP Subscriber Number Screening
Congestion Control (message throttling)
Presence Server
SS7 Security Firewall One implementation of the invention may include the FAT platform coupled with at least one AE. This combination provides both an enhanced form of gateway screening in that messages may be allowed or discarded based on parameters with the MTP and SCCP layers, as well as an application triggering mechanism. The FAT platform will also provide screening on ISUP and TCAP parameters, but an AE may be employed for more detailed screening at these levels and for more complex application logic.

The FAT platform is structured such that it will be common to and support future AEs as they are defined and developed, without impacting core signaling message routing node software. This implies the following:

The FAT platform may be embedded into the core signaling message routing node software base and should not be required to change to support new AEs.

The AEs may or may not reside in the core signaling message routing node software base, but should be modular in nature, for a "plug-and-play" type functionality.

This provides the following advantages:

Changes to core signaling message routing node software are minimized since the FAT code can remain stable while AE code is developed/changed.

As new AEs are developed, only the interface to the FAT platform will need to be tested. Each individual AE will not have to be tested in conjunction with the entire signaling message routing node software base at each release cycle.

Accordingly, it is an object of the invention to provide a filtering and application triggering platform that directs signaling messages to the appropriate application and avoids duplicative processing of the signaling messages.

It is another object of the invention to provide a filtering and application triggering platform that decodes a message and generates a decode key having a common format to be sent along with the message to downstream applications.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Overview

With traditional gateway screening, the parameters within a message are examined in succession and a decision is made at each step whether to drop the message or continue the process. If the message passes all steps, it is routed.

This process is not adequate when the end result is to trigger an "off-board" application because all concerned parameters within the message need to be considered simultaneously, and the combination of those parameters used as a key to determine how the message should be treated, rather than looking at each parameter separately. Therefore, the FAT platform provides a new method for filtering messages and selecting triggers.

Figure 1:
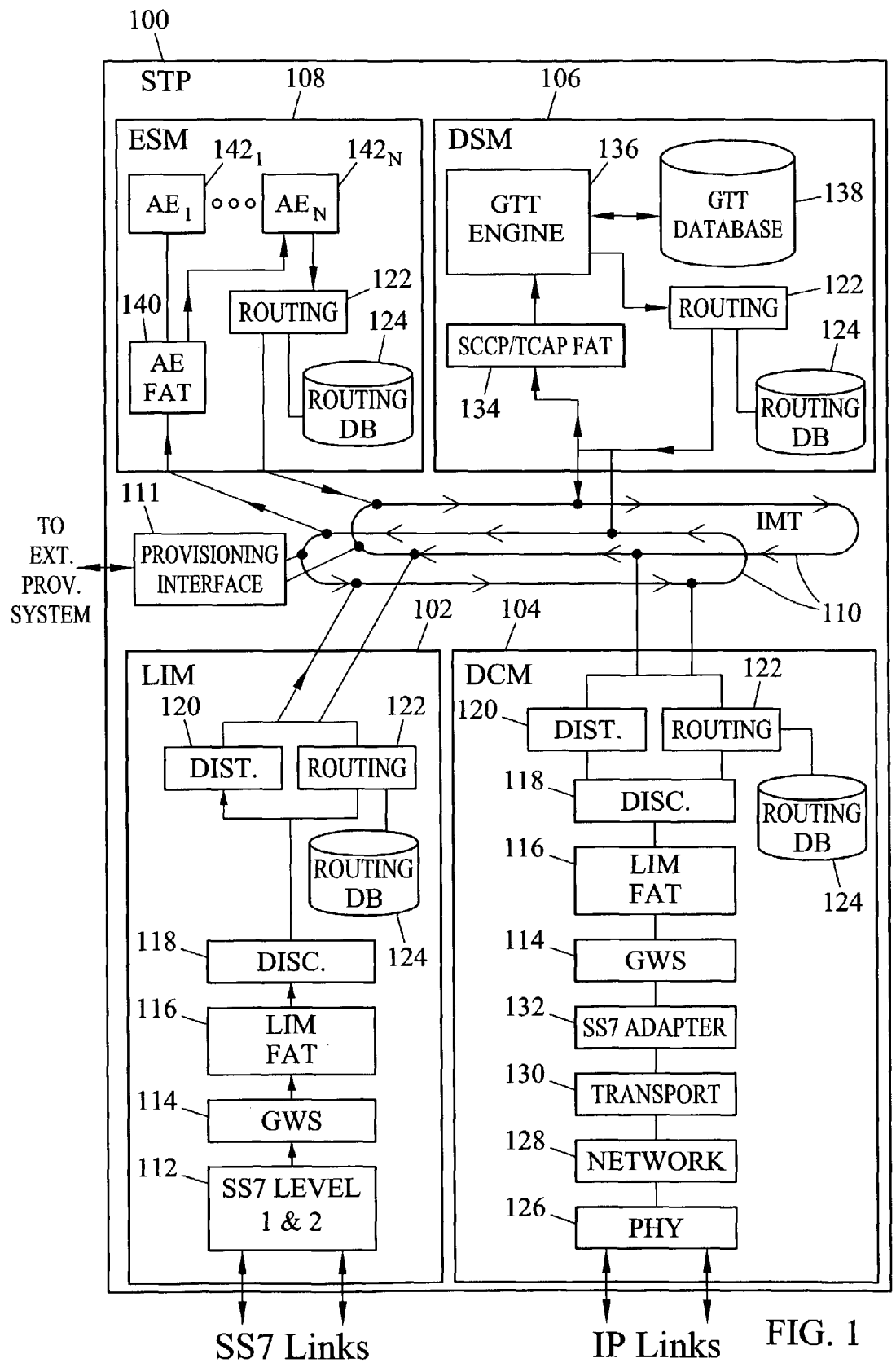
FIG. 1 is block diagram of a signaling message routing node including a filtering and application triggering platform according to an embodiment of the present invention.

FIG. 1 illustrates an example of an exemplary operating environment for a filtering and application triggering platform according to an embodiment of the present invention. Referring to FIG. 1, a signaling message routing node 100, such as an STP, may include a plurality of internal processing modules connected to each other via an internal communications bus. In the illustrated example, the processing modules located in STP 100 include a link interface module (LIM) 102, a data communications module (DCM) 104, a database services module (DSM) 106, and an enhanced services module (ESM) 108. Modules 102, 104, 106, and 108 are connected via a pair of counter-rotating dual-ring buses 110. Each of the modules illustrated in FIG. 1 may include an application processor for executing stored instructions for implementing various telecommunications applications and a communications processor for communicating with the other processing modules via buses 110. A provisioning interface 111 may be coupled to an external provisioning system (not shown) to allow provisioning of databases, FAT rule sets, and FAT triggers within routing node 100.

Link interface module 102 may include hardware and software for sending and receiving SS7 messages over TDM or ATM links. In the illustrated example, link interface module 102 includes an SS7 level 1 and 2 module 112, a gateway screening module 114, a LIM-level filtering and application triggering module 116, a discrimination module 118, a distribution module 120, a routing module 122, and a routing database 124. SS7 level 1 and 2 module 112 performs SS7 level 1 and 2 functions, such as error detection, error correction, and sequencing of SS7 signaling messages. Gateway screening module 114 screens messages based on received destination point codes to determine whether to allow the messages in to the network in which routing node 100 is operating. LIM-level filtering and application triggering module 116 may perform LIM-level filtering and application triggering functions, such as generating a LIM-level decode key and applying one or more triggers to the decode key. These functions will be described in more detail below. Discrimination module 118 determines whether a received message is to be distributed to an internal processing module, such as DSM 106 or ESM 108 or routed over an outbound signaling link. Distribution module 120 receives signaling messages identified by discrimination module 118 as requiring further internal processing and distributes those messages to the appropriate internal processing module. Routing function 122 receives messages identified by discrimination module 118 as requiring routing and routes the messages based on routing data stored in routing database 124.

DCM 104 includes one or more software layers for sending and receiving SS7 and other types of signaling messages over IP signaling links. In the illustrated example, DCM 104 includes a physical layer 126, a network layer 128, a transport layer 130, an SS7 adapter layer 132, a gateway screening module 114, a LIM level filtering and application triggering module 116, a discrimination module 118, a distribution module 120, a routing module 122, and a routing database 124. Physical layer module 126 performs OSI physical layer functions, such as error detection, error correction, and physical layer addressing. In one example, physical layer 126 may be implemented by appropriately configured Ethernet hardware and/or software. Network layer 128 performs OSI network layer functions, such as participation in network layer routing protocols and forwarding messages based on network layer addresses. In one example, network layer 128 may be implemented using appropriately configured Internet protocol (IP) hardware and/or software. Transport layer 130 performs OSI transport functions, such as reliable end-to-end delivery of signaling messages. Transport layer 130 may be implemented using appropriately configured transport control protocol (TCP) or stream controlled transmission protocol (SCTP) hardware and/or software.

SS7 adapter layer 132 may perform functions for sending and receiving SS7 messages over IP transport. SS7 adapter layer 132 may include TALI, M2UA, M2PA, M3UA, SUA, or other SS7 adapter layer as described in the correspondingly named IETF Internet drafts and RFCs. Gateway screening module 114, LIM filtering and application triggering module 116, discrimination module 118, distribution module 120, routing module 122, and routing database 124 may be similar to those components described above with respect to LIM 102. Hence a description thereof will not be repeated therein.

DSM 106 includes an SCCP/TCAP filtering and application triggering module 134, a global title translation engine 136, a global title translation database 138, a routing module 122, and a routing database 124. SCCP/TCAP-level filtering and application triggering module 134 performs SCCP and TCAP decoding of the message, generates an SCCP and TCAP decode key, and performs SCCP and TCAP level triggering. Global title translation engine 136 global title translates received signaling messages identified as requiring global title translation using data stored in global title translation database 138. Routing function 122 and routing database 124 perform MTP-level routing for outbound signaling messages, as described above with regard to LIM 102.

Enhanced services module 108 includes an application engine filtering and application triggering module 140, one or more signaling applications $142_1$-$142_n$, a routing module 122, and a routing database 124. Application engine and filtering and application triggering module 140 performs application-level decoding of a message, generates an application-level decode key, applies triggers to the decode key and forwards messages to the appropriate application engine. Application engines $142_1$-$142_n$ may be telephony signaling applications, which will be described in more detail below. Routing function 122 and routing database 124 perform MTP-level routing of outbound signaling messages, as described above.

Figure 2:
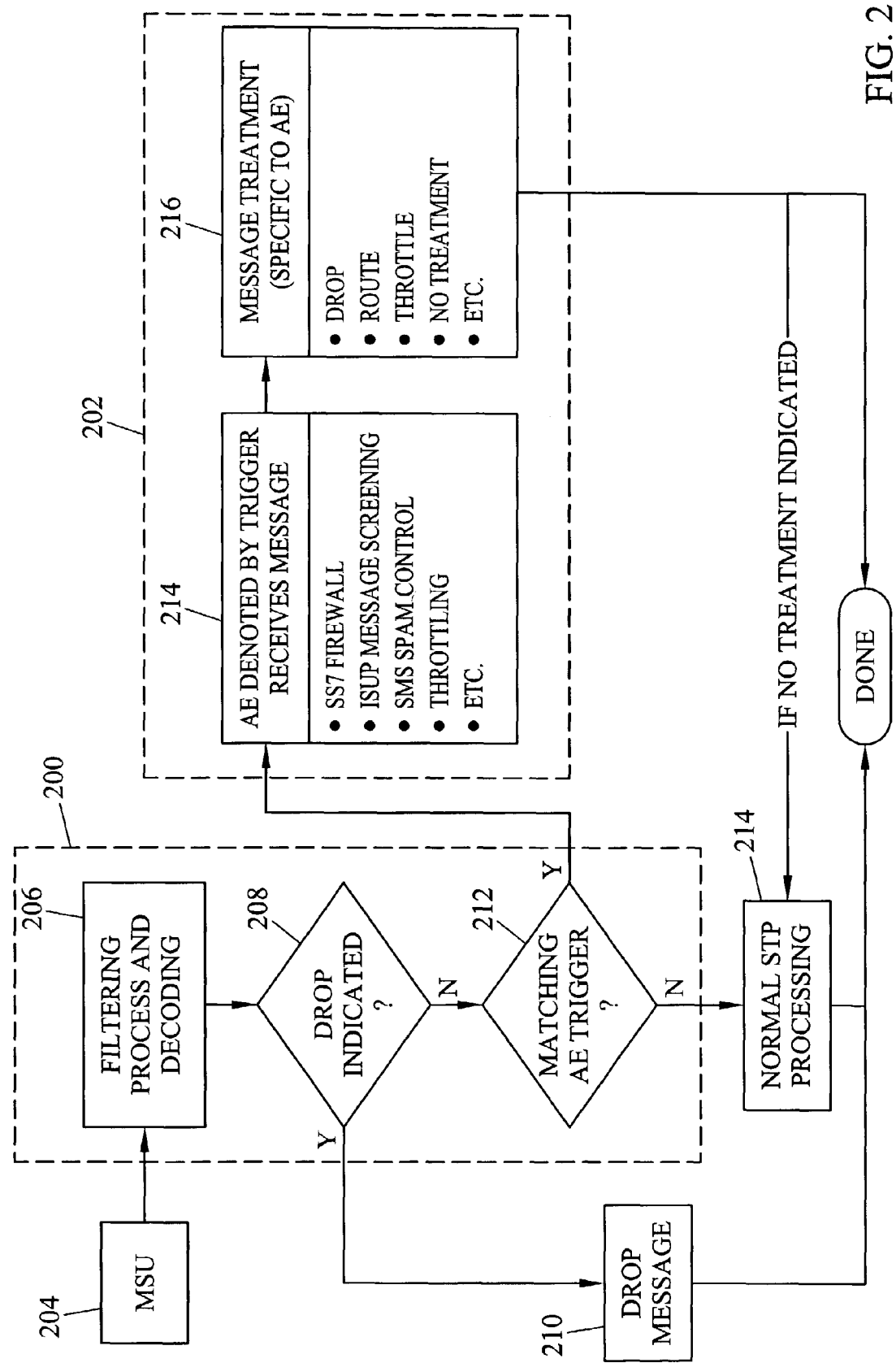
FIG. 2 is a flow chart illustrating exemplary filtering and application triggering processing that may be performed by a filtering and application triggering platform according to an embodiment of the present invention.

FIG. 2 is a flow chart illustrating exemplary overall FAT processing that may be performed by FAT modules 116, 134, and 140 according to an embodiment of the present invention. In FIG. 2, block 200 represents FAT processes, and block 202 represents AE processes. A message signaling unit (MSU) 204 may arrive at a signaling message routing node 100. After processing by lower processing layers, FAT processing may begin, as indicated by block 200. The first phase of FAT processing may include filtering the message to extract one or more parameters from the message and construct a decode key from the parameters, as indicated by block 206. In step 208, the decode key is examined to determine whether the message should be dropped. If the decode key indicates that the message should be dropped, control proceeds to step 210 where the message is dropped. If the decode key does not indicate that the message should be dropped, control proceeds to step 212 where the decode key is compared to an application engine trigger. If the message matches one of the application engine triggers, control proceeds to step 214 where the message is forwarded to the appropriate application engine and application level processing is performed on a message. In the illustrated example, exemplary application engines that may be included within a signaling message routing node are an SS7 firewall application engine, an ISUP message screening application engine, an SMS SPAM control application engine, a throttling application, or other suitable application engines. In block 216, the application engine applies the appropriate treatment to the message.

Returning to step 212, if the decode key does not match any of the application engine triggers, control proceeds to step 214 where normal STP processing is performed. Normal STP processing may include local number portability processing, mobile number portability processing, global title translation, or other suitable STP processing. In one exemplary embodiment, a FAT application module, such as LIM-level FAT applications 116 may be located on a signaling message routing node without specialized application engines. In such an embodiment, LIM FAT applications 116 may operate as enhanced gateway screening functions. In the example where a FAT application operates on a node without application engines, the FAT application may simply generate the decode key and determine whether the message should be dropped or not. If the FAT application determines that the message should not be dropped, the message is forwarded to discrimination function 118 for normal STP processing. If the FAT application determines that the message should be dropped, the message is dropped.

Decode Key

According to an important aspect of the invention, FAT applications 116, 134, and 140 generate a decode key to be appended to a message and transmitted with the message within signaling message routing node 100. The decode key preferably has a fixed format for all types of messages to facilitate message parameter extraction by downstream applications. The decode key may be constructed in stages. For example, LIM-level FAT modules 116 may filter MTP routing information, such as the OPC, DPC, and SIO parameters and begin construction of the decode key using these parameters. SCCP/TCAP-level FAT application 134 may decode SCCP and TCAP parameters in the message and include these in the decode key. Application engine FAT 140 may decode application level parameters from a message and include these parameters in the decode key. Each lower layer FAT preferably passes the partially decoded decode key to the upper layers for further processing.

Figure 3:
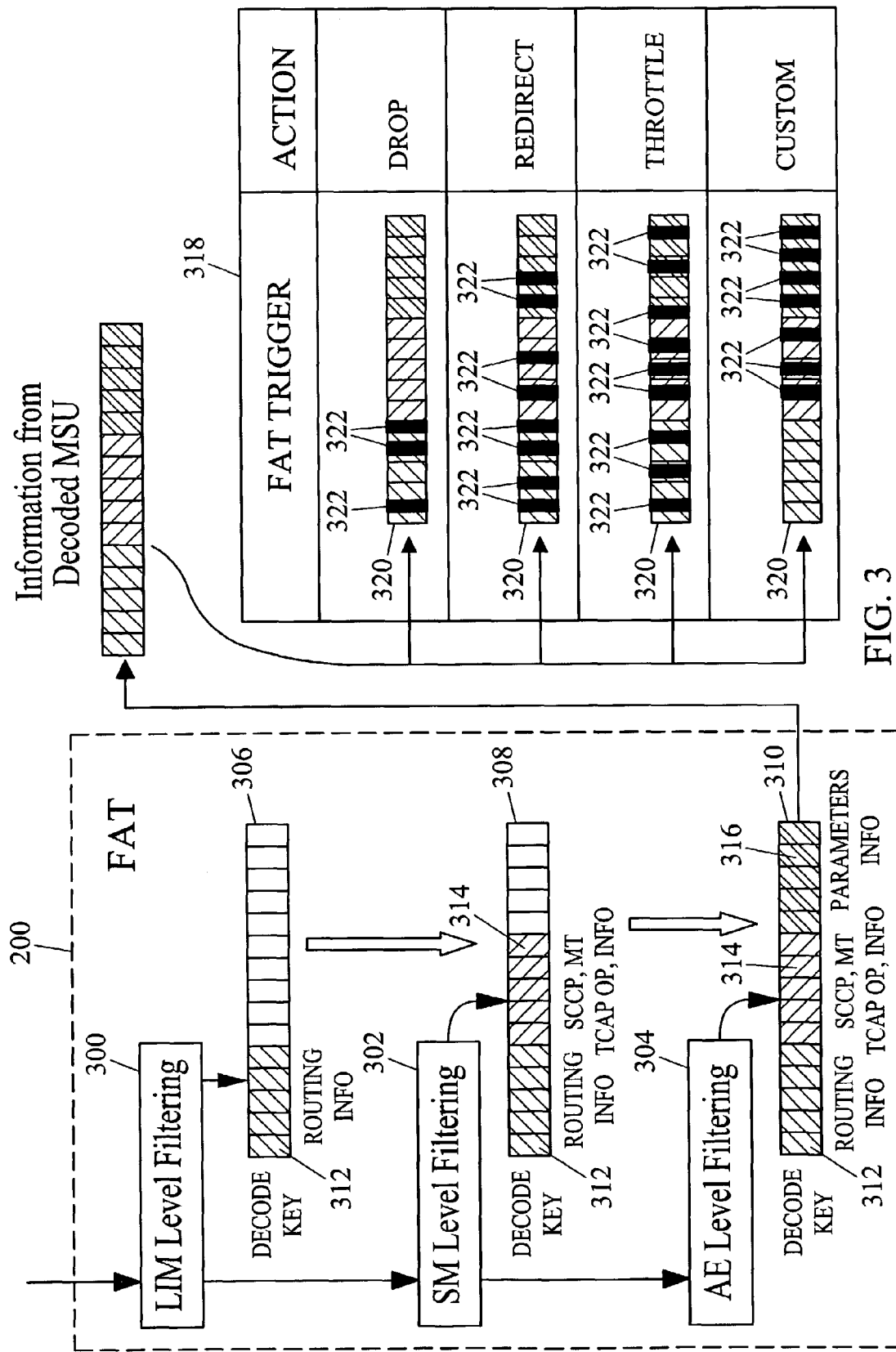
FIG. 3 is a flow chart illustrating exemplary filtering and generation of a message decode key that may be performed by a filtering and application triggering platform according to an embodiment of the present invention.

FIG. 3 illustrates an example of a multi-level decode key according to an embodiment of the present invention. Referring to FIG. 3, block 200 represents overall FAT processing, similar to FIG. 2. Blocks 300, 302, and 304 represent FAT processing at the LIM level, service module (e.g. DSM) level, and application engine level, respectively. Blocks 306, 308, and 310 represent the decode key after processing at each level. For example, at the LIM level, routing information 312 may be inserted into decode key 306 and decode key 306 may be passed to a service module for SCCP-level FAT processing. At the service module level, SCCP, TCAP, MAP, and other SS7 level 4 information 314 may be inserted into decode key 306. At the AE level, application level parameters 316 may be added to decode key 306.

At any one or more of the levels, one or more FAT triggers may be applied to the decode key, and a corresponding action may be performed, as indicated by block 318 in FIG. 3. Within block 318, blocks 320 represent triggers. Blocks 322 in each trigger 320 represent parameters in each trigger for which a match is searched in the decode key. Because the decode key is preferably of fixed format, comparing the decode key to triggers 320 may be performed using a simple arithmetic operation. For example, a mask corresponding to parameters 322 in the trigger may be applied to a particular decode key. The resulting decode key may then be compared to the trigger. If the result is a match, then the corresponding action is performed.

In one exemplary embodiment, the decode key may be implemented as a data array with fixed spaces for each possible field. The data may be delineated by markers, such as commas, to delineate the start and stop of each data field. If certain fields are not present in a particular message, a null character may be inserted in the decode key at the point where the data for that field would be expected. In this manner, the arrangement of the decode key is identical, regardless of the message type. Thus, application engines only need to understand a single decode key in order to be able to work with any type of message. Because a single decode key type may be used for all message types, application engine processing is simplified.

Using a fixed format decode key greatly enhances the performance over conventional signaling message routing nodes where parameter decoding is repeated at various processing layers. By passing a message and a single decode key between processes, subsequent or downstream processes do not have to decode the message from the beginning to extract the information needed by the applications. As a result, throughput of a signaling message routing node is increased. Moreover, because application engines can also use the decode key, and are not required to decode the message from scratch, the efficiency in message processing is further increased.

Although in the examples illustrated in FIGS. 2 and 3 FAT processing and construction of the decode key are performed in multiple levels by multiple separate software modules, the present invention is not limited to such an embodiment. In an alternate embodiment of the invention, LIM FAT modules 116 may construct the entire decode key and forward the message along with the decode key to downstream applications. In such an embodiment, FAT modules 134 and 140 would simply perform triggering, rather than filtering and then triggering. Generating the decode key in a single step or in multiple steps is intended to be within the scope of the invention.

Application Triggering Example

Figure 4:
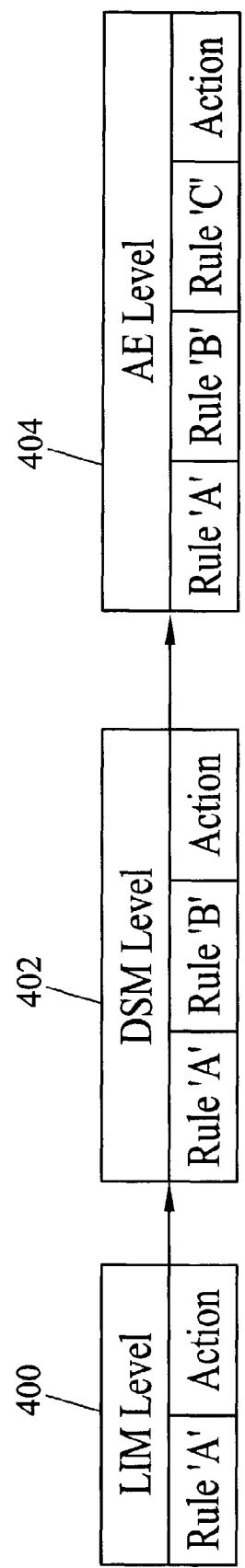
FIG. 4 is a flow chart illustrating exemplary multilevel triggering that may be performed by a filtering and application triggering platform according to an embodiment of the present invention.

FIG. 4 illustrates an example of a multi-level triggering process that may be performed by a FAT platform according to an embodiment of the present invention. Referring to FIG. 4, blocks 400, 402, and 404 represent triggering that may be performed at the LIM, DSM, and application engine levels, respectively. In FIG. 4, each level includes a series of rules and corresponding actions. For example, at the LIM level 400, Rule A may be based on MTP level parameters, such as OPC and DPC. At DSM level 402, triggering may be performed based on Rule A and Rule B, which includes SCCP and TCAP level parameters, such as calling party address, called party address, TCAP Op Code, etc. At application engine level 402, triggering may be based on rule A and rule B and, in addition, on Rule C, which includes application level parameters, such as ISUP parameters.

In addition to having different rules at each level, the corresponding actions performed at each level may be different. For instance, at the LIM or SM level, the available actions may be Drop, Continue, or Go to AE. At the application engine level, more complex actions may be available, such as Manipulate, Throttle, Generate Message, etc.

Following a message through the process in FIG. 4, at the LIM level, LIM FAT 114 decodes the MTP-level information in the message and begins construction of the decode key (see FIG. 3). LIM FAT module 116 compares the information in the partial decode key to the information stored in the rule A column, which may consist of several rows of rules. If a match is found, the corresponding Action is taken. If the information does not match a rule, the message exits LIM FAT 116 and proceeds through normal STP processing (GTT, LNP, routing, etc.). The actions at this level may be:
1. Drop—Exit the FAT module and drop the message.
2. Continue—Send the MSU and the partial decode key to the SM level for further filtering (i.e. "Continue" the FAT process).
3. Go to AE—Exit the FAT module and send the MSU and the partial decode key directly to the triggered AE, skipping the SM level FAT module.

Continuing the example, if the action at the LIM level is Continue, then the entire MSU and the partial decode key is passed to the SM level. SCCP/TCAP FAT module 134 decodes SCCP and TCAP parameters in the message and inserts these parameters in the decode key. SCCP/TCAP FAT 134 compares the partial decode key (now containing both MTP and SCCP/partial TCAP information) to the information stored in the rule 'A' and rule 'B' columns (note that the rule 'A' should be the same as rule 'A' at the LIM level). If a match is found, the corresponding Action is taken. If the information does not match a rule, the message exits FAT module 134 and proceeds through normal STP processing. The actions at this level may be:
1. Drop—Exit the FAT and drop the message.
2. Go to AE—Exit the FAT and send the MSU and partial decode key to the triggered AE.

Continue may not be an option at the SM level. This is because the FAT process may end at the SM level—the message will either be dropped as a result of an action at SM level FAT module 134, an AE will be triggered (action=Go to AE), or no trigger will be found, and the message will fall through to normal STP processing.

Continuing the example, if the action at the SM level is Go to AE, and the AE is indicated receive the message after GTT, then GTT is performed and the post-GTT MSU and partial decode key are passed to the indicated AE. AE FAT 140 finishes decoding the message (e.g., by decoding TCAP user part parameters) and completes the decode key. AE FAT module 140 then compares the information in the decode key to the information in rules 'A', 'B', and 'C'. Rules 'A' and 'B' are the same as those at the SM level. If a match is found, the corresponding action is taken. If a match is not found, the message should be returned to the STP for normal processing. The available actions at the AE level may include Drop, Throttle, Manipulate, etc.

Functional Requirements

FAT modules 116, 134, and 140 may decode some or all of the fields from a received SS7 message, including the following:
1. MTP OPC and DPC
2. MTP SIO:
    a. Service Indicator (SI)
    b. Subservice Field (Network Indicator—NI)
3. Signaling Network Management (SNM) Heading Codes (H0, H1)
4. SCCP Message Type Code
5. SCCP Protocol Class
6. SCCP Management (SCMG) message parameters:
    a. Format Identifier
    b. Affected PC
    c. Affected SSN
7. SCCP CdPA and CgPA parameters:
    a. Point Code (PC)
    b. Subsystem Number (SSN)
    c. Global Title Address (GTA) digits
    d. Numbering Plan (NP)
    e. Nature of Address Indicator (NAI)
    f. Translation Type (TT)
8. ISUP Message Type Code
9. TCAP-User message type indicators:
    a. MAP Operation Code and Application Context Name
    b. CAP Operation Code and Application Context Name
    c. INAP Operation Code and Application Context Name FAT modules 116, 134, and 140 build a decode key that may contain some or all of the decoded information described above. The key preferably meets the requirements discussed below.

The decode key in may be passed between cards in signaling message routing node 100. For example, MTP-level parameters of the key may be constructed on the LIM 102. The decode key may then be forwarded to an SCCP card, such as DSM 106, for construction of the SCCP/TCAP parameters within the key.

The intercepted MSU may be passed along with the matching decode key. The MSU and decode key are preferably not separated until a final decision has been made regarding the disposition of the MSU. Once an action has been taken on the MSU, the decode key may be discarded.

The format of the decode key is left for implementation, but it is preferably in a form such that a routing node, such as an STP, can quickly and efficiently retrieve the necessary information and determine the type of message treatment required. In one example, the decode key a data array with the decoded values located in predetermined fields and null values entered for those fields which were not present in a particular message.

Based on the information decoded and placed into the decode key, FAT modules 116, 134, and 140 may make several determinations concerning a message, including:
1. Origination/destination points and routing information:
   a. MTP OPC, DPC, NI
   b. SCCP PC, SSN, NP, NAI, TT, GTA[1]
2. Type of message:
   a. SNM messages (H0/H1)
   b. ISUP or SCCP messages (Si in MTP)
   c. Type of ISUP message (Message Type Code)
   d. Type of SCCP message (Message Type Code and Protocol Class)
   e. SCMG messages (by format identifier)
3. Type of user/application part (SCCP/TCAP):
   d. MAP (differentiated by SSN)
   e. CAP (differentiated by SSN)
   f. INAP (differentiated by SSN)
4. Type of TCAP-User message:
   a. MAP/CAP/INAP Operation Code
   b. MAP/CAP/INAP Application Context Name FAT modules 116, 134, and 140 may use the information described in the preceding paragraph to make a determination regarding treatment of the message. The following actions may be supported.
1. Discard
2. Route
3. Copy The actions/functions described in the preceding paragraph may be supported at both the LIM and xSM levels. As Illustrated in FIG. 1, LIM refers to a link interface module, which is a card in signaling message routing node 100 that interfaces with SS7 signaling link. xSM refers to database service module and translation service module cards, which perform database-related functions, such as global title translation and number portability lookups. DCM refers to data communication module, which is a card in signaling message routing node 100 capable of sending and receiving SS7 messages over an IP network. A message that matches a certain OPC/DPC combination may be dropped directly at the LIM level without being passed to an SCCP card. Other messages may be passed to the SCCP card, but may contain a CdPA PC/CgPA PC combination that is prohibited. These messages may be dropped at the xSM level. Alternatively, the LIM may perform the entire FAT process without the need for the SM.

If an SCCP UDT message is selected for Discard, a UDTS may be returned to the originator if the "Return Message on Error" flag is set in the UDT. Other error messages returned to the originator are not required unless specifically identified by the SS7 protocol.

If a message is selected for routing, all STP processing that would have normally been performed on the MSU may be performed prior to sending the message. This includes MTP routing, local number portability, mobile number portability, range- and exceptions-based GTT, etc.

The xSM-level FAT processes may be performed on all incoming MSUs for selected linksets, regardless of whether the MSU would normally have needed SCCP-card processing by routing node 100.

As indicated above, there may be a case where a message that would normally have only been MTP routed through routing node 100 and not subjected to GTT or any other SCCP process will be sent to an SCCP card for FAT processing. If SCCP/TCAP FAT module 134 then determines that the message should simply be routed, it may process the message such that the message is MTP routed and not re-subjected to GTT.

FAT processing may occur prior to or after any necessary SCCP processes on the xSM, including LNP, MNP, range- or exceptions-based GTT. The FAT modules 116, 134, and 140 may interact with all existing STP functionality, including range- and exceptions-based GTT, VGTT, EGTT, MGTT, MAP Screening, Prepaid SMS, LNP, MNP, and INP. FAT modules 116, 134, and 140 may operate on both ANSI and ITU, IS-41 and GSM protocol variants.

Interactions with Gateway Screening

Figure 5:
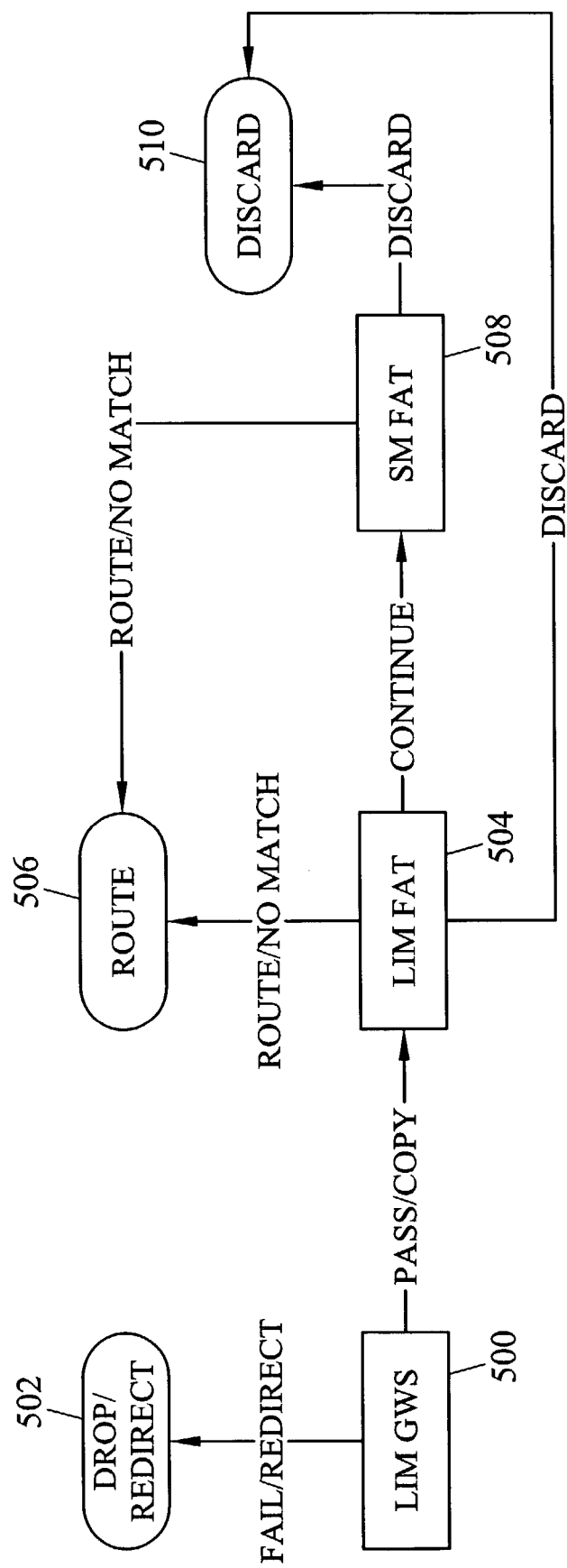
FIG. 5 is a flow chart illustrating exemplary interaction between gateway screening and filtering and application triggering code according to an embodiment of the present invention.

As illustrated in FIG. 1, gateway screening module 114 and LIM filtering and application triggering module 116 may exist on the same processor card. In addition, gateway screening module 114 and filtering and application triggering module 116 may operate on the same signaling linkset. FIG. 5 is illustrates exemplary interactions between gateway screening module 114 and LIM filtering and application triggering module 116 when the modules operate on the same linkset. Referring to FIG. 5, block 500 represents LIM gateway screening that may be performed by gateway screening module 114. Such gateway screening may be performed based on the DPC of a message and/or the called party address in the message. The result of gateway screening is referred to as a stop action. Exemplary stop actions include redirect, in which a received message is dropped or redirected to another application or pass/copy, where the message is passed and/or copied for other purposes. In the example illustrated in FIG. 5, if the result of LIM gateway screening is Fail/Redirect, control proceeds to block 502 where the message is dropped or redirected and there is no interaction with filtering and application triggering module 116. If, on the other hand, the result of gateway screening is Pass/Copy, either the message or a copy of the message is passed to LIM filtering and application triggering module 116, as indicated in block 504 in FIG. 5.

If the result of LIM FAT processing in block 504 is Route/No Match, control proceeds to block 506 where the message is routed to its intended destination without further FAT processing. If the result of LIM FAT processing in block 504 is Continue, control proceeds to block 508 where SM FAT processing is performed. As indicated above, such processing may include decoding the SCCP portion of the message, inserting the decoded SCCP parameters in the decode key, and applying SCCP triggers to the message. If the result of LIM FAT processing in block 504 is Discard, control proceeds to step 508 where the message is discarded. In step 508, if the result of SM FAT processing is Route/No Match, control proceeds to step 506 where the message is routed. If the result of SM FAT processing in step 508 is Discard, control proceeds to block 508 where the message is discarded.

Figure 6:
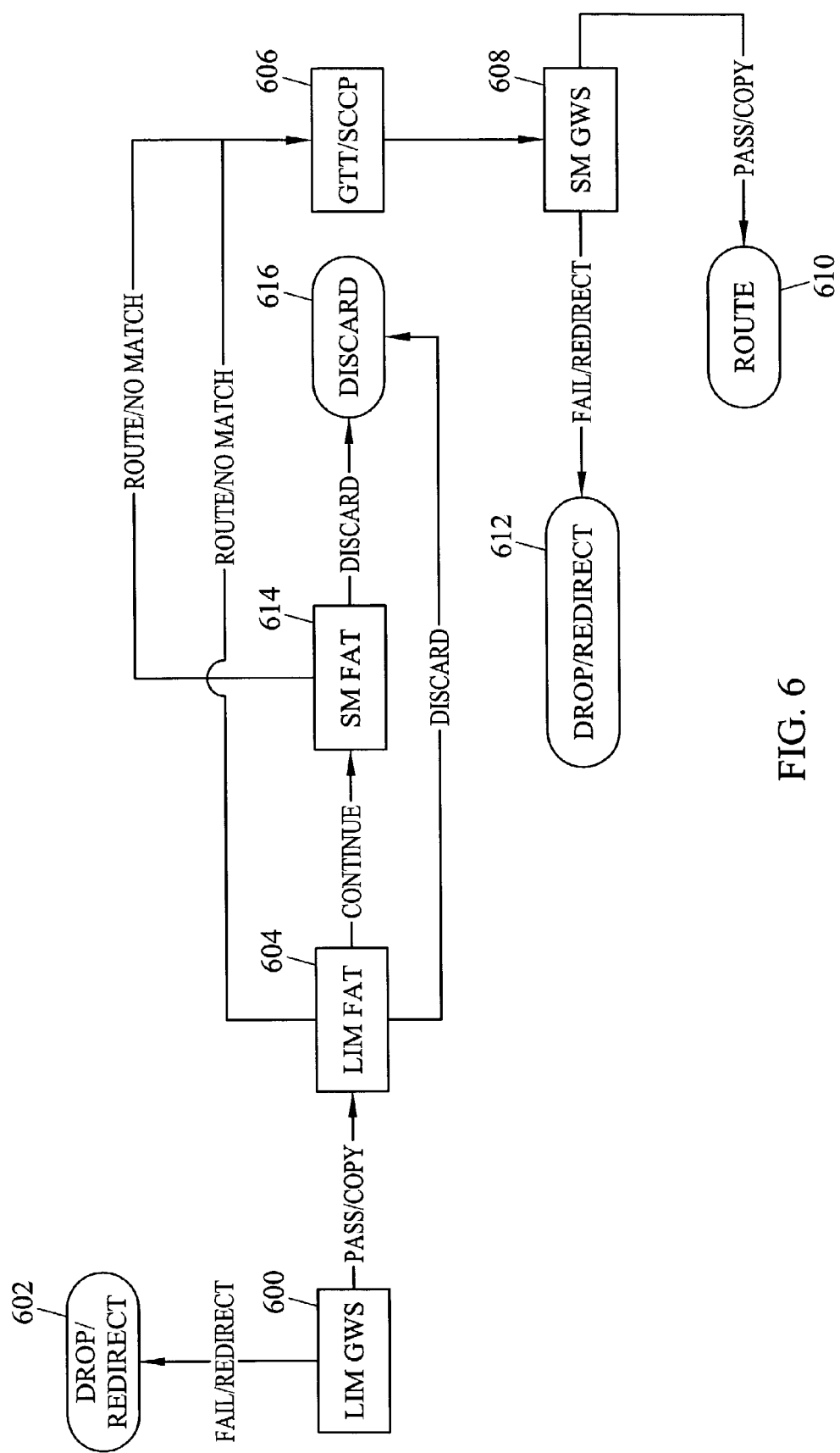
FIG. 6 is a flow chart illustrating exemplary interactions between gateway screening and filtering and application triggering code on a message requiring global title translation according to an embodiment of the present invention.

On linksets that have both GWS and FAT activated, GWS may be performed prior to FAT, as indicated in FIG. 5. However, SCCP called party GWS screens for global title routed messages may be performed after both LIM-level and xSM-level FAT, since these screens are performed after GTT. FIG. 6 illustrates exemplary interaction between LIM-level FAT, SM-level FAT, and GWS for global title routed messages. Referring to FIG. 6, in block 600, LIM gateway screening is performed on a message. If the result of LIM gateway screening is Fail/Redirect, control proceeds to step 602 where the message is dropped or redirected. If the message passes LIM gateway screening, control proceeds to step 604 where LIM FAT processing is performed. If the result of LIM FAT processing is Route/No Match, control proceeds to step 606 where GTT is performed. Once GTT is performed, in step 608, SM-level gateway screening is performed. If the result of SM-level gateway screening is Pass/Copy, the message is routed to its intended, destination, as indicated in block 610. If the result of SM gateway screening is Fail/Redirect, control proceeds to step 612 where the message is dropped or redirected.

Returning to step 604, if the result of LIM FAT processing is Continue, control proceeds to step 614 where SM FAT processing is performed. If the result of SM FAT processing is Discard, control proceeds to step 616 where the message is discarded. Similarly, returning to step 604, if the result of LIM FAT processing is Discard, control proceeds to step 616 where the message is discarded. Finally, returning to step 614, if the result of SM FAT processing is route/no match, control proceeds to steps 606, 608, and 610 or 612 where GTT and SM gateway screening is performed. Thus, as illustrated in FIG. 6, LIM and SM FAT processing may coexist with gateway screening and global title translation in a signaling message routing node.

Considerations for Multiple AEs on the Same System

As illustrated in FIG. 1, multiple application engines 142 may exist in the same routing node 100. Two ways in which multiple AEs can be supported on a single system with a single FAT are: having multiple logical AEs on a single physical AE, or having multiple physical AEs. Each of these embodiments will now be described in detail.

Multiple Logical AEs on Single Physical AE

Support for multiple logical AEs is transparent to FAT modules 116, 134 and 140. Since there may be a single physical location (card, box, etc.) where the AE is located, the FAT simply sends the message and decode key to this location when the AE is triggered. The message treatment at the AE level would be responsible for separating the different applications depending on the parameters within the decode key. In this manner, the AE-level rule set would not necessarily indicate the final message treatment, but may point to another table within the AE where the decision can be made. Although this does not impact the FAT, an example will now be described in detail.

Figure 7:
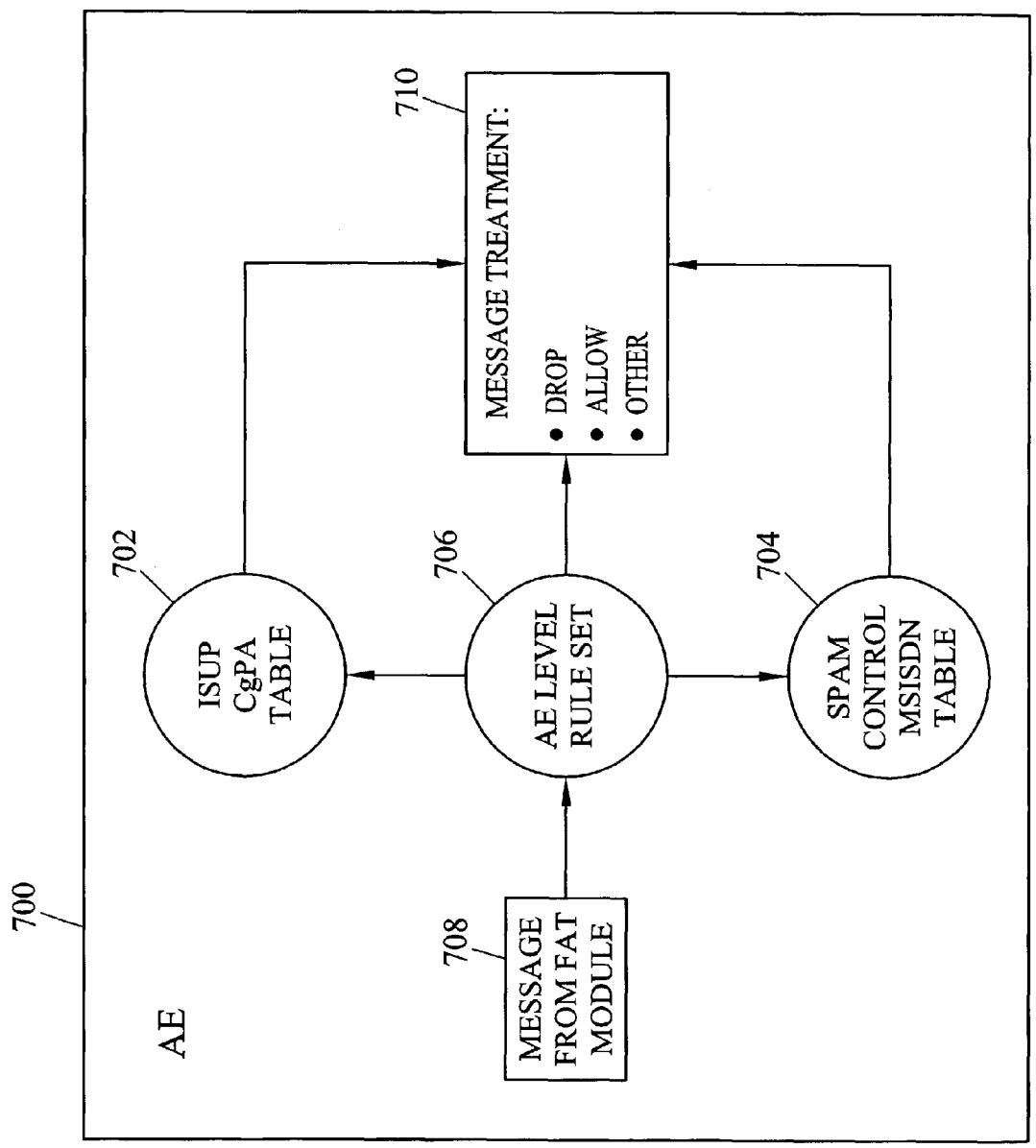
FIG. 7 is a flow chart illustrating exemplary processing for multiple logical application engines on a single physical application engine according to an embodiment of the present invention.

In one exemplary implementation, a single physical AE may include an ISUP calling party screening application as well as a SMS SPAM control application, in addition to simple message treatments such as Drop and Allow. FIG. 7 is a block diagram illustrating an ISUP call screening application located on the same application engine as an SMS SPAM control application. Referring to FIG. 7, application engine 700 includes an ISUP calling party address table 702 for implementing ISUP calling party screening, an SMS SPAM control MSISDN table 704 for implementing SMS SPAM control, an application engine level rule set 706 for implementing application engine level filtering based on a decode key in a message 708 received from a FAT module. Block 710 in FIG. 7 represents exemplary message treatment after screening by modules 702, 704, and 706.

In FIG. 7, AE rule set 706 is one logical AE and can perform simple treatments, such as Drop or Allow, on messages based on matching parameter sets in the rule set table. ISUP CgPA table 702 is another logical AE, which is triggered by a certain combination of parameters in AE rule set table 706. SPAM control MSISDN table 704 is the third logical AE, which is also triggered by a certain combination of parameters in AE rule set table 706. In this example, AE level rule set serves as both an AE message treatment process as well as a higher level filtering and triggering process that feeds into a second logical AE (e.g. ISUP call screening or SPAM Control). This second logical AE is then responsible for performing the message treatment based on parameters within its own table of parameters. Table 1 shown below illustrates an example of an AE level rule set for the example illustrated in FIG. 7.

TABLE 1

AE Level Rule Set for FIG. 7
AE-level Rule Set

| Rule # | OPC | DPC | SI | CgPA SSN | CdPA SSN | TCAP/MAP OpCode | ISUP Msg Type | MAP Param 1 | MAP Param 2 | Treatment |
|---|---|---|---|---|---|---|---|---|---|---|
| 1 | 1-1-1 | 2-2-2 | 'ISUP' | * | * | * | IAM | * | * | ISUP Screening |
| 2 | 1-1-1 | 3-3-3 | 'SCCP' | 8 | 8 | 'MO-FSM' | * | * | * | SPAM Control |
| 3 | 1-1-1 | 3-3-3 | 'SCCP' | 6 | 5 | 'UPD-LCN' | * | MSISDN 1 | * | Drop |

If a message that matches rule #3 in Table 1 arrives at the AE, since the message treatment is 'Drop', the message will be dropped and processing is complete. If another message that matches rule #1 arrives, the message treatment is 'ISUP screening'. Therefore the message will be passed to the secondary 'ISUP screening' logical AE which may contain a table similar to Table 2 shown below:

TABLE 2

ISUP Screening Logical AE CgPA Table
ISUP CgPA Table

| Calling Party Subscriber Number | Treatment |
|---|---|
| 19193802031 | Drop |
| 19194605897 | Allow |
| 19196364239 | Drop |

If the message contained calling party subscriber number of 19193802031, the message would be dropped and processing is complete. If a third message arrives that matches rule #2, the message treatment is 'SPAM Control'. Therefore the message the message will be passed to the secondary 'SPAM Control' logical AE which may contain a table similar to Table 3 shown below:

TABLE 3

SMS SPAM Control Logical AE MSISDN Table
SPAM Control MSISDN Table

| SMS Sender MSISDN | SMS Recipient MSISDN | Treatment |
|---|---|---|
| 19194605897 | 17043768678 | Allow |
| 19193881416 | 18288964457 | Drop |

If the SMS message was sent from MSISDN 19193881416, destined for MSISDN 18288964457, the message would be dropped and processing complete. Had the SMS been sent from MSISDN 19194605897 to MSISDN 17043768678, the message would be allowed and routed.

Multiple Physical AEs on Single FAT System

Figure 8:
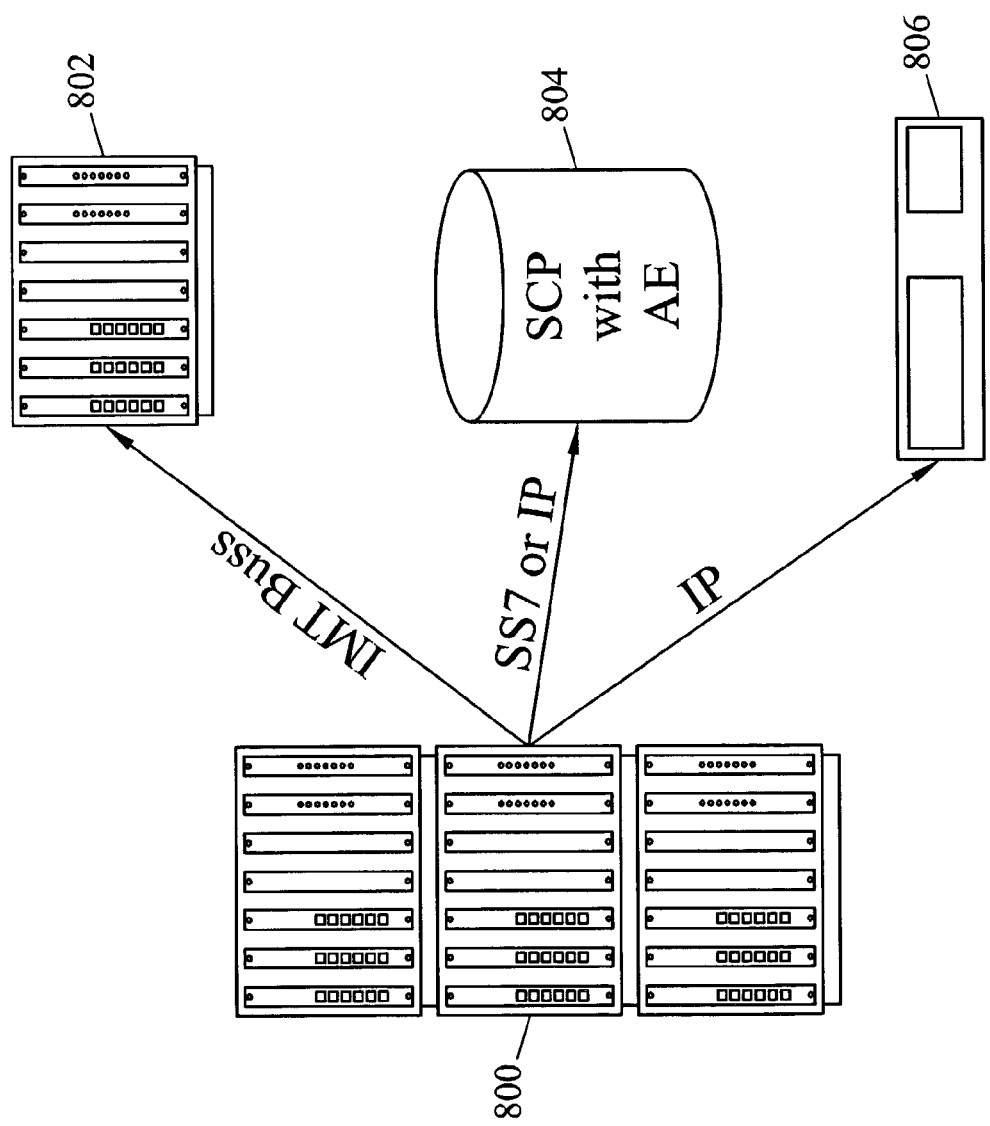
FIG. 8 is a schematic diagram illustrating multiple physical application engines on a single filtering and application triggering system according to an embodiment of the present invention.

In yet another embodiment, a FAT system may include multiple separate physical AEs. In this architecture, several physically separate AEs may exist but be triggered by a single FAT process. The AEs may exist on any combination of hardware, including individual cards in a signaling message routing nodes, separate OEM processor boxes (e.g. SUN Netras), or separate SS7 nodes with a point code (e.g. an SCP). FIG. 8 illustrates an example of multiple physical application engines suitable for the use with a single FAT system according to an embodiment of the present invention. Referring to FIG. 8, a platform 800 may be a telecommunications signaling node, such as an STP. Such a node typically includes multiple shelves. In the illustrated example, shelf 802 may be a component of STP 800. Shelf 802 may include one or more printed circuit boards that include an application engine. Another physical application engine may be located on an SCP 804. SCP 804 may be connected to STP 800 by an SS7 or an IP link. Yet another application engine may be located on an external computing platform 806, such as a SUN Netra computing platform. STP 800 may include one or more FAT processing modules as illustrated in FIG. 1.

When only one physical AE is operational on a FAT node, there are no issues with correct addressing—the FAT simply default routes all messages needing AE service to one location. However, when more than one physical AE is connected to a single FAT node, there must be an addressing scheme that the FAT can use to direct the message to the correct AE. Depending on the type of connection to platform 800, this addressing could be in the form of an IP address, a SS7 point code, or an IMT buss address.

Regardless of the form that the AE address takes, the FAT modules within platform 800 preferably have access to the address information and are preferably able to associate the address information with a particular trigger. This address information may be contained in the rule set itself along with the trigger and the action. If this approach is taken, LIM and SM FAT rule sets may be similar to the rule sets illustrated in FIG. 9.

AE on an STP AE Card

Figure 9:
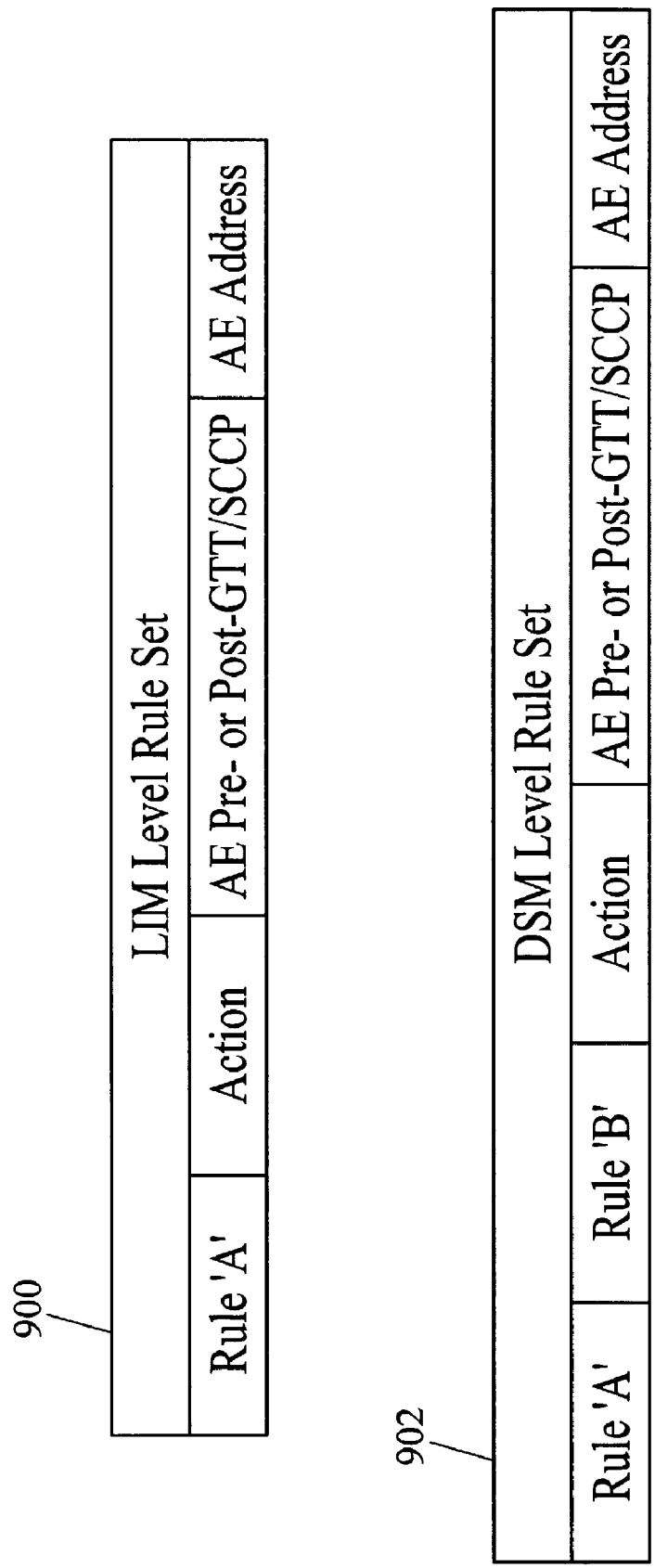
FIG. 9 is a block diagram illustrating exemplary LIM and DSM level rule sets with application engine addresses according to an embodiment of the present invention.

In the case of an AE running on a STP card inside the same frame/node as the FAT process itself, the FAT may access the AE over the STP's internal bus, or possibly via a TCP/IP Ethernet connection from a SM. If the AE card is accessed over the STP's internal bus, the card's bus address must be accessible by the FAT and be part of the trigger. If the card is accessed via a TCP/IP Ethernet connection directly from the next-generation SM (and possibly next-generation LIM), then the card's IP address must be accessible by the FAT and be part of the trigger. In FIG. 9, both LIM rule set 900 and SM rule set 902 include AE addresses corresponding to the particular application engine to which the message should be addressed. In addition, each rule set includes one or more rules, an action, and an indication as to whether the rules could be applied pre or post GTT. Table 4 shown below illustrates an exemplary rule set with AE addresses associated with internal and external application engines. In Table 4, the first row identifies an application engine that is located on the same internal bus as the card containing the FAT module.

TABLE 4

Logical View of Generic Rule Set with AE Addresses

| Rule 'A' | | | Rule 'B' | | | Action | AE Pre- or Post- GTT/SCCP | AE ID | |
|---|---|---|---|---|---|---|---|---|---|
| OPC | DPC | SI | CdPA GT | CgPA GT | OpCode | | | Location | Address |
| 1-1-1 | 2-2-2 | 3 | 9195551211 | 9195553311 | 61 | Go to AE | Pre | IMT | 128 |
| 1-1-1 | 3-3-3 | 3 | 9194446788 | 7075558980 | 47 | Go to AE | Pre | EXTIP | 128.128.255.100 |
| 1-1-1 | 2-2-2 | 5 | * | * | * | Go to AE | * | EXTSS7 | 5-5-5 |

AE on a SCP/SS7 Database Node

In the case of an AE running on a SCP or other traditional SS7 database node, the FAT would access the SCP via SS7 links, which may be traditional TDM links or SS7 over IP links (e.g. TALI, Sigtran, etc). In either case, the FAT module would address the node by its SS7 point code (PC) and possibly subsystem number (SSN). Thus, the PC and SSN would need to be accessible to the FAT module and be part of the trigger. In Table 4, the third row indicates an application engine located on an external SS7 platform. The address of the application engine is an SS7 point code.

AE on a Network Server

In the case of an AE running on a network server (e.g. SUN Netra, etc.), the FAT module would access the AE via a TCP/IP Ethernet connection to the server. In this case the FAT module would address the AE by an IP address, which must be accessible by the FAT module and be part of the trigger. In Table 4, the second row represents an application engine located on an external IP platform.

Table 4 shows a logical view of different rules sets and how they may point to different AE addresses. This is only a logical view—the actual representation of the data may be implemented differently. In Table 4, a match on the rule set in the first row is a trigger for an AE. In this case, the "AE ID—Location" entry tells the FAT module that the AE must be reached via the internal bus, and the "AE ID—Address" entry tells the FAT the 8-bit internal bus address 128 for the AE. Likewise, a match on the rule set in the second row would trigger an AE that the FAT would reach via a direct IP connection with the IP address 128.128.255.100. A match on the rule set in the third row triggers an AE reached via a standard SS7 link (which could be an SS7 over IP link) by addressing point code 5-5-5.

OA&M Requirements

General

FAT rule sets may be provisioned on LIMs, DSMs, AEMs, or any other type of module within a routing node. These rule sets may include a list of parameters within an SS7 message and a corresponding action to take if parameters within an incoming message match those within a particular rule. Logically, there may be two separate rule sets—one at the xSM level and one at the LIM level. This is due to the split nature of decoding. The LIM may not be able to decode enough information to determine whether a message should be routed or discarded. Therefore, the FAT process would continue at the xSM. On the other hand, the LIM may have enough information to take action on the message without sending it to the xSM. Table 5A illustrates an example of a combined rule set and Tables 5B and 5C respectively illustrate exemplary xSM and LIM rule sets suitable for use with FAT application modules according to embodiments of the present invention. Tables 5A-5C illustrate a logical structure for explanation only. Actual implementation of database structure may vary.

TABLE 5A

Combined Rule Set
Provisioned Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|-----|-----|-----|-----|-----|-----|-----|-----|-----|-----|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 5 | 5-5-5 | 2-2-2 | 'SCCP' | * | * | * | * | * | * | * | * | Drop |
| 6 | 1-1-1 | 3-3-3 | 'ISUP' | * | * | * | * | * | * | * | CGB | Drop |
| 7 | 1-1-1 | 3-3-3 | 'ISUP' | * | * | * | * | * | * | * | RSC | Allow |
| 8 | 1-1-1 | 4-4-4 | 'ISUP' | * | * | * | * | * | * | * | * | Drop |

TABLE 5B xSM Level Rule Set
xSM-level Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|-----|-----|-----|-----|-----|-----|-----|-----|-----|-----|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 6 | 1-1-1 | 3-3-3 | 'ISUP' | * | * | * | * | * | * | * | CGB | Drop |
| 7 | 1-1-1 | 3-3-3 | 'ISUP' | * | * | * | * | * | * | * | RSC | Allow |

TABLE 5C

LIM Level Rule Set
LIM-level Rule Set

| Rule# | OPC | DPC | SI | Action |
|---|---|---|---|---|
| 1, 2, 3, 4 | 1-1-1 | 2-2-2 | 'SCCP' | Continue |
| 5 | 5-5-5 | 2-2-2 | 'SCCP' | Drop |
| 6, 7 | 1-1-1 | 3-3-3 | 'ISUP' | Continue |
| 8 | 1-1-1 | 4-4-4 | 'ISUP' | Drop |

In the example shown in Table 5C, the LIM has enough information to immediately drop messages that match rules 5 and 8 without continuing to the xSM for further FAT processing. In this case the XSM does not need to store these rules, and they are absent from the xSM-level rule set.

For messages matching rules 1, 2, 3 or 4, the LIM does not contain enough information and these must be passed to the XSM, with decode key, for further FAT processing. These four rules can be collapsed into a single entry with a common action at the LIM level. Likewise for message matching rules 6 and 7.

For efficiency, the LIM may not be given the entire provisioned rule set. As shown in Tables 5A-5C, it may only be given the information it needs. This allows rules that are different only at the SCCP level to be collapsed to a single entry for storing in the LIM, as is the case for rules 1, 2, 3 and 4 in Tables 5A-5C. Also, if a rule contains enough information such that the LIM can make the message treatment decision without forwarding to the xSM, it may not be necessary to store this rule in the xSM, as is the case for rules 5 and 8 in Tables 5A-5C.

The FAT may be provisionable from a single source, using one set of commands—i.e. the LIM rule set and xSM rule set would not have to be provisioned separately. This will require a provisioning system to filter the rule sets and send only the necessary information to the LIMs and xSMs, respectively.

Revising/Adding to Existing Rule Sets

Because the provisioning system for a signaling message routing node may package data differently for LIMs versus xSMs, special consideration may be given to cases when an existing rule is revised or a new rule is added to an existing rule set. This is due to the overlap that may exist between rule sets. An efficient process for self-healing of the data in both the LIMs and xSMs may also be included in a signaling message routing node with a FAT platform according to the present invention. New or revised data may be loaded in an incremental fashion, i.e., adding a new rule may not require a full reload of the xSMs or LIMs.

Adding a New Rule to an Existing Rule Set

In one example, the following two rules may be added to the existing rule set shown in Tables 5A-5C.

TABLE 6

New FAT Rules

| OPC | DPC | SI | CgPA SSN | CdPA SSN | CgPA PC | CdPA PC | CdPA TT | CgPA TT | TCAP/MAP OpCode | ISUP Msg Type | Action |
|---|---|---|---|---|---|---|---|---|---|---|---|
| 5-5-5 | 2-2-2 | 'SCCP' | 8 | 8 | * | * | 11 | * | 'SRI' | * | Drop |
| 5-5-5 | 2-2-2 | 'SCCP' | 8 | 8 | * | * | 11 | * | 'UPD-LCN' | * | Allow |

Both rules shown in Table 6 are a modification of rule 5 in the provisioned rule set of Table 5A. Previously, rule 5 was completely resolved at the LIM level, and therefore, it was not distributed to the xSM-level rule set. On the LIM, a message with OPC=5-5-5, DPC=2-2-2, and SI='SCCP' would have been dropped per the LIM-level rule set. Now, in the provisioned rule set, the provisioning system must revise rule 5 to match one of the new rules, and add a new rule 9 to account for the other new rule.

With the addition of these rules, the message cannot be resolved at the LIM level and the rules must be added to the xSM-level. Therefore, the provisioning system must send an update to the xSMs instructing them to add these rules to its rule set.

At the LIM level, the action for a message matching OPC=5-5-5, DPC=2-2-2, and SI='SCCP' can no longer be 'Drop' since the message must go to the FAT at the xSM level before a decision can be made. Therefore, the provisioning system must also send an update to the affected LIM(s) instructing them to change the action for rule 5 from 'Drop' to 'Continue'. At the LIM level, rules 5 and 9 can be collapsed into a single rule.

After this update, the rule set would be as listed below in Tables 7A-7C.

TABLE 7A

Revised Combined Rule Set
Provisioned Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|------|----|----|-------|-------|----|----|-----------|-----|-------|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 5 | 5-5-5 | 2-2-2 | 'SCCP' | 8 | 8 | * | * | 11 | * | 'SRI' | * | Drop |
| 6 | 1-1-1 | 3-3-3 | 'ISUP' | * | * | * | * | * | * | * | CGB | Drop |
| 7 | 1-1-1 | 3-3-3 | 'ISUP' | * | * | * | * | * | * | * | RSC | Allow |
| 8 | 1-1-1 | 4-4-4 | 'ISUP' | * | * | * | * | * | * | * | * | Drop |
| 9 | 5-5-5 | 2-2-2 | 'SCCP' | 8 | 8 | * | * | 11 | * | 'UPD-LCN' | * | Allow |

TABLE 7B

Revised xSM Rule Set
xSM-level Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|------|----|----|-------|-------|----|----|-----------|-----|-------|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 5 | 5-5-5 | 2-2-2 | 'SCCP' | 8 | 8 | * | * | 11 | * | 'SRI' | * | Drop |
| 6 | 1-1-1 | 3-3-3 | 'ISUP' | * | * | * | * | * | * | * | CGB | Drop |
| 7 | 1-1-1 | 3-3-3 | 'ISUP' | * | * | * | * | * | * | * | RSC | Allow |
| 9 | 5-5-5 | 2-2-2 | 'SCCP' | 8 | 8 | * | * | 11 | * | 'UPD-LCN' | * | Allow |

TABLE 7C

Revised LIM Rule Set
LIM-level Rule Set

| Rule# | OPC | DPC | SI | Action |
|-------|-----|-----|------|--------|
| 1, 2, 3, 4 | 1-1-1 | 2-2-2 | 'SCCP' | Continue |
| 5, 9 | 5-5-5 | 2-2-2 | 'SCCP' | Continue |
| 6, 7 | 1-1-1 | 3-3-3 | 'ISUP' | Continue |
| 8 | 1-1-1 | 4-4-4 | 'ISUP' | Drop |

Revisions to Existing Rules

Rules 6 and 7 in the provisioned rule set in Tables 5A-5C allow ISUP traffic from 1-1-1 to 3-3-3 with a message type of RSC to be routed, but will cause ISUP traffic between the same two nodes with a message type of CGB to be discarded. If the user wanted to drop all ISUP traffic originating at 1-1-1 and destined for 3-3-3, a new rule would be provisioned, which would look like that shown below in Table 8.

When the provisioning system receives this new rule, it must analyze the existing data and realize that this rule supercedes two existing rules. It should therefore delete the existing rules 6 and 7 and replace them will the single rule shown in Table 8. This also requires changes at both the xSM and LIM levels. Previously on the LIM, a message with OPC=1-1-1, DPC=3-3-3, and SI='ISUP' would have been sent to an xSM for further FAT processing because it could not be completely resolved at the LIM. The xSM then contained the complete rule for disposition of messages matching rules 6 and 7.

With the revision in Table 8, the message can be completely resolved at the LIM level and the rules are no longer needed at the xSM-level. Therefore, the provisioning system must send an update to the xSMs instructing them to delete rules 6 and 7 from its rule set.

At the LIM level, the action for a message matching OPC=1-1-1, DPC=3-3-3, and SI='ISUP' can be changed to 'Drop' since the LIM has all of the information needed to make a decision regarding the message. Therefore, the provisioning system must also send an update to the affected LIM(s) instructing them to change the action for rule 6,7 from 'Continue' to 'Drop'.

TABLE 8

New FAT Rule

| OPC | DPC | SI | CgPA SSN | CdPA SSN | CgPA PC | CdPA PC | CdPA TT | CgPA TT | TCAP/MAP OpCode | ISUP Msg Type | Action |
|-----|-----|------|----|----|----|----|----|----|-----------|-----|------|
| 1-1-1 | 3-3-3 | 'ISUP' | * | * | * | * | * | * | * | * | Drop |

After this update, the rule sets in the xSM and LIM will look like those shown in Tables 9A-9C. Updates are shown in underlined text.

persistent and redundant storage of a master copy of the xSM-level and LIM-level real-time data. This is needed for quick reloads to the xSMs and LIMs.

TABLE 9A

Updated Combined Rule Set
Provisioned Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|-----|----------|----------|---------|---------|---------|---------|-----------------|---------------|--------|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 5 | 5-5-5 | 2-2-2 | 'SCCP' | 8 | 8 | * | * | 11 | * | 'SRI' | * | Drop |
| 6, 7 | 1-1-1 | 3-3-3 | 'ISUP' | * | * | * | * | * | * | * | * | Drop |
| 8 | 1-1-1 | 4-4-4 | 'ISUP' | * | * | * | * | * | * | * | * | Drop |
| 9 | 5-5-5 | 2-2-2 | 'SCCP' | 8 | 8 | * | * | 11 | * | 'UPD-LCN' | * | Allow |

TABLE 9B

Updated xSM Rule Set
xSM-level Rule Set

| # | OPC | DPC | SI | CgPA SSN | CdPA SSN | CgPA PC | CdPA PC | CdPA TT | CgPA TT | TCAP/MAP OpCode | ISUP Msg Type | Action |
|---|-----|-----|-----|----------|----------|---------|---------|---------|---------|-----------------|---------------|--------|
| 1 | 1-1-1 | 2-2-2 | 'SCCP' | 8 | 8 | 1-1-1 | 5-5-5 | 11 | * | 'MO-FSM' | * | Drop |
| 2 | 1-1-1 | 2-2-2 | 'SCCP' | 8 | 8 | 1-1-1 | 8-8-8 | 11 | 12 | 'MO-FSM' | * | Allow |
| 3 | 1-1-1 | 2-2-2 | 'SCCP' | 8 | 5 | 4-4-4 | 3-3-3 | 13 | * | 'ATI' | * | Drop |
| 4 | 1-1-1 | 2-2-2 | 'SCCP' | 8 | 5 | 4-4-4 | 5-5-5 | 16 | * | 'UPD-LCN' | * | Allow |
| 5 | 5-5-5 | 2-2-2 | 'SCCP' | 8 | 8 | * | * | 11 | * | 'SRI' | * | Drop |
| <u>6</u> | ~~1-1-1~~ | ~~3-3-3~~ | ~~'ISUP'~~ | ~~*~~ | ~~*~~ | ~~*~~ | ~~*~~ | ~~*~~ | ~~*~~ | ~~*~~ | ~~CGB~~ | ~~Drop~~ |
| <u>7</u> | ~~1-1-1~~ | ~~3-3-3~~ | ~~'ISUP'~~ | ~~*~~ | ~~*~~ | ~~*~~ | ~~*~~ | ~~*~~ | ~~*~~ | ~~*~~ | ~~RSC~~ | ~~Allow~~ |
| 9 | 5-5-5 | 2-2-2 | 'SCCP' | 8 | 8 | * | * | 11 | * | 'UPD-LCN' | * | Allow |

TABLE 9C

Updated LIM Rule Set
LIM-level Rule Set

| Rule# | OPC | DPC | SI | Action |
|-------|-----|-----|-----|--------|
| 1, 2, 3, 4 | 1-1-1 | 2-2-2 | 'SCCP' | Continue |
| 5, 9 | 5-5-5 | 2-2-2 | 'SCCP' | Continue |
| <u>6,7</u> | <u>1-1-1</u> | <u>3-3-3</u> | <u>'ISUP'</u> | <u>Drop</u> |
| 8 | 1-1-1 | 4-4-4 | 'ISUP' | Drop |

Administrative/Provisioning Requirements

FAT may be enabled on a per-linkset basis. It may also be possible to disable FAT on a particular linkset after it has been enabled. The FAT rule sets may be provisionable from a single source, using a single set of commands. A user may provision the information shown above for use by the FAT. A user/craftsperson is not required to enter the xSM-level rule sets and LIM-level rule sets separately. The provisioning system is preferably capable of separating the provisioned data into separate rule sets—one for distribution to the xSMs and one (or more) for distribution to the LIMs. The xSMs may be provisionable via a 10/100 baset Ethernet connection.

The provisioning system may provide persistent and redundant storage of a golden copy of the provisioned data. This golden copy may be a readable copy of the provisioned data, before it is broken down into xSM- and LIM-level, real-time rule sets. The provisioning system may provide persistent and redundant storage of a master copy of the xSM-level and LIM-level real-time data. This is needed for quick reloads to the xSMs and LIMs.

The provisioning system may analyze incremental updates to an existing rule set and send the appropriate information to the xSMs and/or LIMs. If a new rule changes the relationship of existing rules and the actions taken at either the xSM or LIM levels, the provisioning system may update both the xSM and LIM level rule sets with the appropriate information such that the database is "self-healing" and does not become overloaded with redundant or out-of-date information. The LIM level and xSM level FAT tables may each support a minimum of 10,000 rules.

Measurements and Alarms

The available measurement pegs that may be collected by FAT modules 116, 134, and 140 include the following:

- Total number of messages discarded by FAT at LIM level
- Total number of messages discarded by FAT at xSM level
- Total number of messages per OPC/DPC combination discarded by FAT
- Total number of SNM and SCMG messages discarded by FAT
- Total number of messages per ISUP Message Type discarded by FAT
- Total number of messages per MAP Operation Code discarded by FAT
- Total number of messages per INAP Operation Code discarded by FAT
- Total number of messages per CdPA PC/SSN discarded by FAT
- Total number of messages per CgPA PC/SSN discarded by FAT A UIM may be generated when a FAT module discards a message. The UIM may contain the basic reason that the message was not allowed by the FAT modules, i.e., "Message type not allowed from this originator", or "Message type not allowed for this OPC/DPC combination", etc.

Thus, the present invention includes a filtering and application triggering platform that generates a decode key for a received signaling message and passes the decode key along with the message as it is processed by a signaling message routing node. At each processing level, triggers are applied to the decode key. If the message passes the triggers of one level, the message may be forwarded to another level. If the message fails one of the triggers at a particular level, the message may be discarded. Because the decode key is passed along with the message, each processing level in the routing node is not required to redecode the message, as with conventional routing nodes. As a result, processing efficiency and message throughput in the routing node are increased.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for filtering signaling messages and selecting application triggers, the method comprising:
    (a) receiving a telecommunications signaling message at a communications module in a telecommunications signaling message routing node;
    (b) decoding a portion of the received telecommunications signaling message at the communications module and building a decode key based on the decoded portion of the telecommunications signaling message, the decode key including at least one telecommunications signaling parameter from the received telecommunication signaling message, wherein the decode key has a fixed format for different types of messages to facilitate message parameter insertion by other modules of the signaling message routing node and to facilitate message parameter extraction by downstream applications, wherein the decode key includes plural parameter values extracted from different levels of the signaling message;
    (c) selecting an application engine for processing the telecommunications signaling message based on the at least one parameter in the decode key, the application engine implementing a telecommunications signaling application; and
    (d) forwarding the telecommunications signaling message and the decode key to the selected application engine for further processing, wherein the application engine receives the telecommunications signaling message and the decode key and uses information in the decode key to make a determination regarding treatment of the telecommunications signaling message.

2. The method of claim 1 wherein receiving a telecommunications signaling message at a communications module in a telecommunications signaling message routing node includes receiving an SS7 signaling message at a communications module in a signal transfer point.

3. The method of claim 1 wherein receiving a telecommunications signaling message at a communications module in a telecommunications signaling message routing node includes receiving an IP-encapsulated SS7 signaling message at a communications module in a signal transfer point.

4. The method of claim 1 wherein building the decode key includes extracting parameters from the received telecommunications signaling message and storing the parameters in a data array.

5. The method of claim 4 wherein storing the parameters in a data array includes storing the parameters in a data array having a common format regardless of the message type.

6. The method of claim 1 wherein selecting an application engine based on the decode key includes applying a trigger to the decode key.

7. The method of claim 1 wherein selecting an application engine based on the decode key includes selecting an application engine within the telecommunications signaling message routing node based on the decode key.

8. The method of claim 1 wherein selecting an application engine based on the decode key includes selecting an application engine outside of the telecommunications signaling message routing node based on the decode key.

9. The method of claim 1 wherein forwarding the telecommunications signaling message and the decode key to the selected application engine includes forwarding the telecommunications signaling message and the decode key to an application engine in the telecommunications signaling message routing node.

10. The method of claim 1 wherein forwarding the telecommunications signaling message and the decode key to the selected application engine includes forwarding the telecommunications signaling message and the decode key to an application engine external to the telecommunications signaling message routing node.

11. A method for processing telecommunications signaling messages in a telecommunications signaling message routing node, the method comprising:
    in a telecommunications signaling message routing node:
    (a) receiving a telecommunications signaling message at a communications link module in a signaling message routing node;
    (b) on the communications link module, extracting predetermined telecommunications signaling parameters from the telecommunications signaling message and generating a decode key including the predetermined parameters, wherein the decode key has a fixed format for different types of messages to facilitate message parameter insertion by other modules of the signaling message routing node and to facilitate message parameter extraction by downstream applications, wherein the decode key includes plural parameter values extracted from different levels of the signaling message;
    (c) applying a first triggering rule to at least one of the predetermined parameters in the decode key and determining an triggering action based on the first triggering rule; and
    (d) in response to a triggering action indicating that processing of the telecommunications signaling message should continue, forwarding the telecommunications signaling message and the decode key to another module implementing a telecommunications signaling application within the telecommunications signaling message routing node for further processing, wherein the module implementing the telecommunications signaling application receives the telecommunications signaling message and the decode key and uses the information in the decode key to make a determination regarding treatment of the telecommunication signaling message.

12. The method of claim 11 wherein receiving the telecommunications signaling message at a communications link module includes receiving the telecommunications signaling message at a link interface module within a signal transfer point.

13. The method of claim 11 wherein generating a decode key includes generating a decode key including message transfer part (MTP)-level parameters and applying a first triggering rule includes applying an MTP-level triggering rule to the parameters.

14. The method of claim 13 wherein forwarding the telecommunications signaling message to another processing module includes forwarding the telecommunications signaling message to a signaling connection control part (SCCP) module within the telecommunications signaling message routing node.

15. The method of claim 14 comprising at the SCCP module, extracting SCCP parameters from the telecommunications signaling message, adding the SCCP parameters to the decode key, and simultaneously applying an SCCP triggering rule and the MTP level triggering rule to the decode key.

16. The method of claim 15 comprising selecting an application engine based on the MTP-level triggering rule and the SCCP-level triggering rule.

17. The method of claim 16 comprising forwarding the message to the selected application engine.

18. The method of claim 17 wherein forwarding the telecommunications signaling message to the selected application engine includes forwarding the telecommunications signaling message to an application engine located on a printed circuit board within the telecommunications signaling message routing node.

19. The method of claim 17 wherein forwarding the telecommunications signaling message to the selected application engine includes forwarding the telecommunications signaling message to an application engine located on a platform external to the telecommunications signaling message routing node.

20. The method of claim 1 including, at the selected application engine, using the decode key to process the telecommunications signaling message.

21. A telecommunications signaling message routing node comprising:
(a) a communications link module including a processor for receiving a telecommunications signaling message from an external signaling link; and
(b) a first filtering and application triggering module operatively associated with the communications link module for receiving the telecommunications signaling message, for extracting telecommunications signaling parameters from the telecommunications signaling message, for generating a decode key including the parameters, wherein the decode key has a fixed format for different types of messages to facilitate message parameter insertion by other modules of the signaling message routing node and to facilitate message parameter extraction by downstream applications, wherein the decode key includes plural parameter values extracted from different levels of the signaling message, and for applying a first triggering rule to the parameters in the decode key, wherein the first filtering and application triggering module is adapted to forward the telecommunications signaling message and the decode key to another module implementing a telecommunications signaling application within the telecommunications signaling message routing node in response to a predetermined relationship between the decode key and the first triggering rule, wherein the module implementing the telecommunications signaling application receives the telecommunications signaling message and the decode key and uses the information in the decode key to make a determination regarding treatment of the telecommunications signaling message.

22. The telecommunications signaling message routing node of claim 21 wherein the communication link module comprises an SS7 communications link module.

23. The telecommunications signaling message routing node of claim 21 wherein the communications link module comprises an Internet protocol communications link module.

24. The telecommunications signaling message routing node of claim 21 wherein the first filtering and application triggering module reads message transfer part (MTP) level parameters from the telecommunications signaling message and places the MTP-level parameters in the decode key.

25. The telecommunications signaling message routing node of claim 24 wherein the first filtering and application trigger module is adapted to forward the telecommunications signaling message to a signaling connection control part (SCCP) card within the telecommunications signaling message routing node in response to the predetermined relationship between the decode key and the first triggering rule.

26. The telecommunications signaling message routing node of claim 25 wherein the SCCP card includes a second filtering and application triggering module for reading SCCP parameters from the telecommunications signaling message, for adding the SCCP parameters to the decode key, and for simultaneously applying the first triggering rule and a second triggering rule to the decode key.

27. The telecommunications signaling message routing node of claim 26 wherein the second filtering and application triggering module is adapted to select an application engine for processing the telecommunications signaling message based on the first and second triggering rules.

28. The telecommunications signaling message routing node of claim 27 wherein the second filtering and application triggering module is adapted to forward the telecommunications signaling message to the selected application engine.

29. The telecommunications signaling message routing node of claim 28 comprising an application engine module located within the telecommunications signaling message routing node for receiving the telecommunications signaling message from the second filtering and application triggering module and for processing the telecommunications signaling message.

30. The telecommunications signaling message routing node of claim 29 wherein the application engine module includes a third filtering and application triggering module for reading application-level parameters from the telecommunications signaling message, adding the application-level parameters to the decode key, and applying a third triggering rule to the decode key.

31. The telecommunications signaling message routing node of claim 30 wherein the third filtering and application triggering module is adapted to select between multiple logical application engine modules based on a predetermined relationship between the decode key and the third triggering rule.

32. The telecommunications signaling message routing node of claim 21 wherein the decode key has a fixed format independent of the type of the telecommunications signaling message.

33. The telecommunications signaling message routing node of claim 21 wherein the communication links module and the first filtering and application triggering module are components of a signal transfer point.

34. A telecommunications signaling message routing node for selectively processing received telecommunications signaling messages, the telecommunications signaling message routing node comprising:
(a) a communications module including a processor for receiving a telecommunications signaling message;
(b) a filtering and application triggering function operatively associated with the communications module for decoding a portion of the telecommunications signaling message and constructing a decode key based on the decoded portion of the telecommunications signaling message, the decode key including at least one telecommunications signaling parameter from the received telecommunications signaling message, wherein the decode key has a fixed format for different types of messages to facilitate message parameter insertion by other modules of the signaling message routing node and to facilitate message parameter extraction by downstream applications, wherein the decode key includes plural parameter values extracted from different levels of the signaling message;
(c) a distribution function for selecting, using the at least one parameter in the decode key, an application engine implementing a telecommunications signaling application for processing the telecommunications signaling message and for distributing the telecommunications signaling message and the decode key to the application engine; and
(d) an application engine for processing the telecommunications signaling message, wherein the application engine receives the telecommunications signaling message and the decode key and uses information in the decode key to make a determination regarding treatment of the telecommunications signaling message.

35. The telecommunications signaling message routing node of claim 34 wherein the decode key comprises a data array.

36. The telecommunications signaling message routing node of claim 35 wherein the data array has a common format regardless of the telecommunications signaling message type.

37. The telecommunications signaling message routing node of claim 34 wherein the application engine uses the decode key to process the telecommunications signaling message.

38. The method of claim 1 wherein the decoding and selecting steps occur within the telecommunications signaling message routing node.

39. The telecommunications signaling message routing node of claim 21 wherein the communications link module and the first filtering and application triggering module are located within the telecommunications signaling message routing node.

40. The telecommunications signaling message routing node of claim 34 wherein the communications module, the filtering and application triggering function, and the distribution function are located within the telecommunications signaling message routing node.

* * * * *